United States Patent
Krishan et al.

(10) Patent No.: US 11,224,009 B2
(45) Date of Patent: Jan. 11, 2022

(54) METHODS, SYSTEMS, AND COMPUTER READABLE MEDIA FOR ENABLING TRANSPORT QUALITY OF SERVICE (QOS) IN 5G NETWORKS

(71) Applicant: Oracle International Corporation, Redwood Shores, CA (US)

(72) Inventors: Rajiv Krishan, Bangalore (IN); Sridhar Karuturi, Raleigh, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/730,799

(22) Filed: Dec. 30, 2019

(65) Prior Publication Data
US 2021/0204200 A1 Jul. 1, 2021

(51) Int. Cl.
*H04W 48/16* (2009.01)
*H04W 4/50* (2018.01)
(Continued)

(52) U.S. Cl.
CPC .......... *H04W 48/16* (2013.01); *H04W 4/50* (2018.02); *H04W 28/0268* (2013.01); *H04W 28/24* (2013.01); *H04W 84/042* (2013.01)

(58) Field of Classification Search
CPC ... H04W 48/16; H04W 4/50; H04W 28/0268; H04W 28/24; H04W 84/042;
(Continued)

(56) References Cited

U.S. PATENT DOCUMENTS

| 5,381,413 A | 1/1995 | Tobagi et al. |
| 6,748,435 B1 | 6/2004 | Wang et al. |

(Continued)

FOREIGN PATENT DOCUMENTS

| CN | 105635345 B | 2/2019 |
| CN | 109788078 A | 5/2019 |

(Continued)

OTHER PUBLICATIONS

"3rd Generation Partnership Project; Technical Specification Group Core Network and Terminals; 5G Systems; Network Function Repository Services; Stage 3 (Release 16)," 3GPP TS 29.510 V.16.1.1, pp. 1-87 (Oct. 2019).
(Continued)

*Primary Examiner* — Diane D Mizrahi
(74) *Attorney, Agent, or Firm* — Jenkins, Wilson, Taylor & Hunt, P.A.

(57) ABSTRACT

A method for enabling 5G transport quality of service (QoS) includes receiving a service discovery request from a consumer network function (NF) or service communications proxy (SCP). The method further includes accessing a 5G transport QoS policy database and determining that a 5G transport QoS policy applies to the service discovery request. The method further includes, in response to determining that a 5G transport QoS policy applies to the discovery request, generating a service discovery response message and inserting a network layer QoS value for implementing the policy in the service discovery response message. The method further includes transmitting the service discovery response message to the consumer NF or SCP.

20 Claims, 8 Drawing Sheets

(51) Int. Cl.
*H04W 28/02* (2009.01)
*H04W 28/24* (2009.01)
*H04W 84/04* (2009.01)

(58) Field of Classification Search
CPC ......... H04L 69/22; H04L 67/12; H04L 67/02; H04L 41/5058; H04L 67/16; H04L 41/5003
See application file for complete search history.

(56) References Cited

U.S. PATENT DOCUMENTS

| | | | |
|---|---|---|---|
| 7,782,776 | B2 | 8/2010 | Shankar et al. |
| 8,023,482 | B2 | 9/2011 | Gong et al. |
| 8,300,637 | B1 | 10/2012 | Bennett, III et al. |
| 8,645,565 | B2 | 2/2014 | Sparks et al. |
| 8,811,228 | B2 | 8/2014 | Lopez et al. |
| 8,879,431 | B2 | 11/2014 | Ridel et al. |
| 8,954,080 | B2 | 2/2015 | Janakiraman et al. |
| 9,246,762 | B1 | 1/2016 | Watkins |
| 9,667,590 | B2 | 5/2017 | Yan et al. |
| 10,097,504 | B2 | 10/2018 | Backholm |
| 10,285,155 | B1 | 5/2019 | Dodd-Noble et al. |
| 10,299,128 | B1 | 5/2019 | Suthar et al. |
| 10,361,843 | B1 | 7/2019 | Suthar et al. |
| 10,595,256 | B1 | 3/2020 | Marupaduga et al. |
| 10,609,154 | B2 | 3/2020 | Talebi Fard et al. |
| 10,616,934 | B2 | 4/2020 | Talebi Fard et al. |
| 10,637,753 | B1 | 4/2020 | Taft et al. |
| 10,652,098 | B2 | 5/2020 | Kim |
| 10,772,062 | B1 | 9/2020 | Albasheir et al. |
| 10,778,527 | B2 * | 9/2020 | Assali ............... H04L 67/101 |
| 10,791,044 | B1 | 9/2020 | Krishan et al. |
| 10,819,636 | B1 * | 10/2020 | Goel ............... H04L 47/783 |
| 10,880,370 | B2 | 12/2020 | Seenappa et al. |
| 2003/0174649 | A1 | 9/2003 | Shankar et al. |
| 2003/0223414 | A1 | 12/2003 | Wong |
| 2004/0003069 | A1 | 1/2004 | Wong |
| 2004/0141473 | A1 | 7/2004 | Buot |
| 2004/0208183 | A1 | 10/2004 | Balachandran et al. |
| 2005/0193096 | A1 | 9/2005 | Yu et al. |
| 2006/0010224 | A1 | 1/2006 | Sekar et al. |
| 2007/0242738 | A1 | 10/2007 | Park et al. |
| 2009/0055835 | A1 | 2/2009 | Zhu |
| 2009/0141625 | A1 | 6/2009 | Ghai et al. |
| 2009/0222584 | A1 | 9/2009 | Josefsberg et al. |
| 2011/0078674 | A1 | 3/2011 | Ershov |
| 2011/0202604 | A1 | 8/2011 | Craig et al. |
| 2013/0029708 | A1 | 1/2013 | Fox et al. |
| 2013/0039176 | A1 | 2/2013 | Kanode et al. |
| 2013/0198269 | A1 | 8/2013 | Fleischman et al. |
| 2013/0272123 | A1 | 10/2013 | Lee et al. |
| 2014/0040975 | A1 | 2/2014 | Raleigh et al. |
| 2014/0379901 | A1 | 12/2014 | Tseitlin et al. |
| 2015/0016266 | A1 | 1/2015 | Dumitrescu et al. |
| 2015/0071074 | A1 | 3/2015 | Zaidi et al. |
| 2015/0263987 | A1 | 9/2015 | Klein et al. |
| 2016/0142324 | A1 | 5/2016 | Vihtari et al. |
| 2016/0156513 | A1 | 6/2016 | Zhang et al. |
| 2016/0164788 | A1 | 6/2016 | Goel et al. |
| 2016/0234119 | A1 | 8/2016 | Zaidi et al. |
| 2016/0315743 | A1 | 10/2016 | Nagaraj et al. |
| 2016/0352588 | A1 | 12/2016 | Subbarayan et al. |
| 2016/0380906 | A1 | 12/2016 | Hodique et al. |
| 2017/0221015 | A1 | 8/2017 | June et al. |
| 2018/0039494 | A1 | 2/2018 | Lander et al. |
| 2018/0083882 | A1 | 3/2018 | Krishan et al. |
| 2018/0159780 | A1 | 6/2018 | Essigmann et al. |
| 2018/0183724 | A1 | 6/2018 | Callard et al. |
| 2018/0213391 | A1 | 7/2018 | Inoue |
| 2018/0262625 | A1 | 9/2018 | McCarley et al. |
| 2018/0285794 | A1 | 10/2018 | Gray-Donald et al. |
| 2018/0324247 | A1 | 11/2018 | Hood et al. |
| 2018/0324646 | A1 | 11/2018 | Lee et al. |
| 2018/0343567 | A1 | 11/2018 | Ashrafi |
| 2019/0007366 | A1 | 1/2019 | Voegele et al. |
| 2019/0045351 | A1 | 2/2019 | Zee et al. |
| 2019/0075552 | A1 | 3/2019 | Yu et al. |
| 2019/0116486 | A1 | 4/2019 | Kim et al. |
| 2019/0116521 | A1 | 4/2019 | Qiao et al. |
| 2019/0140895 | A1 | 5/2019 | Ennis, Jr. et al. |
| 2019/0158364 | A1 | 5/2019 | Zhang et al. |
| 2019/0173740 | A1 | 6/2019 | Zhang et al. |
| 2019/0174561 | A1 | 6/2019 | Sivavakeesar |
| 2019/0182875 | A1 | 6/2019 | Talebi Fard et al. |
| 2019/0191348 | A1 | 6/2019 | Futaki et al. |
| 2019/0191467 | A1 | 6/2019 | Dao et al. |
| 2019/0222633 | A1 | 7/2019 | Howes et al. |
| 2019/0223093 | A1 | 7/2019 | Watfa et al. |
| 2019/0230556 | A1 | 7/2019 | Lee |
| 2019/0261244 | A1 | 8/2019 | Jung et al. |
| 2019/0268270 | A1 | 8/2019 | Fattah |
| 2019/0306251 | A1 | 10/2019 | Talebi Fard et al. |
| 2019/0306907 | A1 | 10/2019 | Andreoli-Fang et al. |
| 2019/0313236 | A1 | 10/2019 | Lee et al. |
| 2019/0313437 | A1 | 10/2019 | Jung et al. |
| 2019/0313469 | A1 | 10/2019 | Karampatsis et al. |
| 2019/0335002 | A1 | 10/2019 | Bogineni et al. |
| 2019/0335534 | A1 | 10/2019 | Atarius et al. |
| 2019/0342229 | A1 | 11/2019 | Khinvasara et al. |
| 2019/0342921 | A1 | 11/2019 | Loehr et al. |
| 2019/0349426 | A1 * | 11/2019 | Smith ............... H04L 45/20 |
| 2019/0349901 | A1 | 11/2019 | Basu Mallick et al. |
| 2019/0357092 | A1 | 11/2019 | Jung et al. |
| 2019/0380031 | A1 | 12/2019 | Suthar et al. |
| 2019/0394284 | A1 | 12/2019 | Baghel et al. |
| 2019/0394624 | A1 | 12/2019 | Karampatsis et al. |
| 2019/0394833 | A1 | 12/2019 | Talebi Fard et al. |
| 2020/0007632 | A1 | 1/2020 | Landais et al. |
| 2020/0008069 | A1 | 1/2020 | Zhu et al. |
| 2020/0028920 | A1 | 1/2020 | Livanos et al. |
| 2020/0045753 | A1 | 2/2020 | Dao et al. |
| 2020/0045767 | A1 | 2/2020 | Velev et al. |
| 2020/0053670 | A1 | 2/2020 | Jung et al. |
| 2020/0053724 | A1 | 2/2020 | MolavianJazi et al. |
| 2020/0053828 | A1 | 2/2020 | Bharatia et al. |
| 2020/0059420 | A1 | 2/2020 | Abraham |
| 2020/0059856 | A1 | 2/2020 | Cui et al. |
| 2020/0084663 | A1 | 3/2020 | Park et al. |
| 2020/0092423 | A1 | 3/2020 | Qiao et al. |
| 2020/0092424 | A1 | 3/2020 | Qiao et al. |
| 2020/0127916 | A1 | 4/2020 | Krishan |
| 2020/0136911 | A1 | 4/2020 | Assali et al. |
| 2020/0137174 | A1 | 4/2020 | Stammers et al. |
| 2020/0177629 | A1 | 6/2020 | Hooda et al. |
| 2020/0313996 | A1 | 10/2020 | Krishan et al. |
| 2020/0404608 | A1 | 12/2020 | Albasheir et al. |
| 2020/0412597 | A1 | 12/2020 | Goel et al. |
| 2021/0000723 | A1 * | 1/2021 | Strand ............... A61C 11/00 |
| 2021/0044481 | A1 | 2/2021 | Xu et al. |
| 2021/0067480 | A1 | 3/2021 | Goel |
| 2021/0067485 | A1 | 3/2021 | Goel |
| 2021/0105214 | A1 | 4/2021 | Goel |

FOREIGN PATENT DOCUMENTS

| | | |
|---|---|---|
| EP | 2 575 303 A1 | 4/2013 |
| WO | WO 2017/143915 A1 | 8/2017 |
| WO | WO 2018/174021 A1 | 9/2018 |
| WO | WO 2018/174516 A1 | 9/2018 |
| WO | WO 2019/034609 A1 | 2/2019 |
| WO | WO 2019/062596 A1 | 4/2019 |
| WO | WO 2019/076273 A1 | 4/2019 |
| WO | WO 2019/144321 A1 | 8/2019 |
| WO | WO 2019/220172 A1 | 11/2019 |
| WO | WO 2020/091934 A1 | 5/2020 |
| WO | WO 2020/263486 A1 | 12/2020 |

(56) References Cited

FOREIGN PATENT DOCUMENTS

WO    WO 2021/040827 A1    3/2021
WO    WO 2021/055998 A1    3/2021

OTHER PUBLICATIONS

"3rd Generation Partnership Project; Technical Specification Group Service and System Aspects; System Architecture for the 5G System (5GS); Stage 2 (Release 16)," 3GPP TS 23.501 V16.2.0, pp.

"3rd Generation Partnership Project; Technical Specification Group Core Network and Terminals; 5G System; Technical Realization of Service Based Architecture; Stage 3 (Release 16)," 3GPP TS 29.500 V16.1.0, pp. 1-43 (Sep. 2019).

Nichols et al., "Definition of the Differentiated Services Field (DS Field) in the IPv4 and IPv6 Headers," Internet Engineering Task Force (IEFT) Netwok Working Group Request for Comments (RFC) 2474, The Internet Society, pp. 1-20 (Dec. 1998).

Advisory Action for U.S. Appl. No. 16/356,446 (dated Dec. 22, 2020).

Notice of Allowance and Fee(s) Due for U.S. Appl. No. 16/555,817 (dated Dec. 3, 2020).

Commonly-assigned, co-pending Continuation-in-Part U.S. Appl. No. 17/102,404 for "Methods, Systems, and Computer Readable Media for Policing Access Point Name-Aggregate Maximum Bit Rate (APN-AMBR) Across Packet Data Network Gateway Data Plane (P-GW DP) Worker Instances," (Unpublished, filed Nov. 23, 2020).

Commonly-assigned, co-pending U.S. Appl. No. 17/082,871 for "Methods, Systems, and Computer Readable Media for Rank Processing for Network Function Selection," (Unpublished, filed Oct. 28, 2020).

Commonly-assigned, co-pending Continuation-in-Part U.S. Appl. No. 17/074,553 for "Methods, Systems, and Computer Readable Media for Actively Discovering and Tracking Addresses Associated with 4G Service Endpoints," (Unpublished, filed Oct. 19, 2020).

"P-GW Administration Guide, StarOS Release 21.20," Cisco, pp. 1-1164 (Oct. 11, 2020).

"3rd Generation Partnership Project; Technical Specification Group Core Network and Terminals; Non-Access-Stratum (NAS) protocol for Evolved Packet System (EPS); Stage 3 (Release 17)," 3GPP TS 24.301, V17.0.0, pp. 1-585 (Sep. 2020).

3rd Generation Partnership Project; Technical Specification Group Services and System Aspects; Architecture enhancements to facilitate communications with packet data networks and applications (Release 16), 3GPP TS 23.682, V16.8.0, pp. 1-135 (Sep. 2020).

Non-Final Office Action for U.S. Appl. No. 16/697,021 (dated Sep. 29, 2020).

Final Office Action for U.S. Appl. No. 16/356,446 (dated Sep. 8, 2020).

Commonly-assigned, co-pending U.S. Appl. No. 17/009,725 for "Methods, Systems, and Computer Readable Media for Service Communications Proxy (SCP)-Specific Prioritized Network Function (NF) Discovery and Routing," (Unpublished, filed Sep. 1, 2020).

Notice of Allowance and Fee(s) Due and Examiner-Initiated Interview Summary for U.S. Appl. No. 16/453,955 (dated Aug. 26, 2020).

Commonly-assigned, co-pending U.S. Appl. No. 17/001,599 for "Methods, Systems, and Computer Readable Media for Optimized Network Function (NF) Discovery and Routing Using Service Communications Proxy (SCP) and NF Repository Function (NRF)," (Unpublished, filed Aug. 24, 2020).

Notification of the Transmittal of the International Search Report and the Written Opinion of the International Searching Authority, or the Declaration for International Application No. PCT/US2020/034723 (dated Aug. 17, 2020).

Non-Final Office Action for U.S. Appl. No. 16/555,817 (dated Aug. 7, 2020).

"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).

Commonly-assigned, co-pending U.S. Appl. No. 16/945,794 for "Methods, Systems, and Computer Readable Media for Preferred Network Function (NF) Location Routing Using Service Communications Proxy (SCP)," (Unpublished, filed Jul. 31, 2020).

Notification of Transmittal of the International Search Report and the Written Opinion of the International Searching Authority, or the Declaration for International Application Serial No. PCT/US2020/035004 (dated Jul. 7, 2020).

"3rd Generation Partnership Project; Technical Specification Group Core Network and Terminals; 5G System; Network Function Repository Services; Stage 3 (Release 16)," 3GPP TS 29.510 V16.4.0, pp. 1-206 (Jul. 2020).

"3rd Generation Partnership Project; Technical Specification Group Core Network and Terminals; 5G System; Technical Realization of Service Based Architecture; Stage 3 (Release 16)," 3GPP TS 29.500 V16.4.0 pp. 1-79 (Jun. 2020).

Notice of Allowance and Fee(s) Due for U.S. Appl. No. 16/369,691 (dated May 12, 2020).

Non-Final Office Action for U.S. Appl. No. 16/356,446 (dated May 11, 2020).

Notice of Allowance and Fee(s) Due for U.S. Appl. No. 16/176,920 (dated Apr. 16, 2020).

"3rd Generation Partnership Project; Technical Specification Group Services and System Aspects; Procedures for the 5G System (5GS); Stage 2 (Release 16)," 3GPP TS 23.502 V16.4.0, pp. 1-582 (Mar. 2020).

"3rd Generation Partnership Project; Technical Specification Group Services and System Aspects; System architecture for the 5G System (5GS); Stage 2 (Release 16)," 3GPP TS 23.501 V16.4.0, pp. 1-430 (Mar. 2020).

Cheshire et al., "Apple's DNS Long-Lived Queries protocol," Network Working Group, Apple, Inc., pp. 1-26 (Aug. 22, 2019).

Li et al., "Mobile Edge Computing Platform Deployment in 4G LTE Networks: A Middlebox Approach," https://www.usenix.org/system/files/conference/hotedge18/hotedge18-papers-li.pdf, 6 pages (2018).

"3rd Generation Partnership Project; Technical Specification Group Core Network and Terminals; Domain Name System Procedures; Stage 3 (Release 13)," 3GPP TS 29.303 V13.4.0, pp. 1-69 (Jun. 2016).

Abley et al., "A Mechanism for Remote-Triggered DNS Cache Flushes (DNS FLUSH)," Network Working Group, Google, pp. 1-12 (Jun. 24, 2013).

"LTE and Beyond," https://ytd2525.wordpress.com/2013/03/06/lte-and-beyond/, 3 pages (2013).

Applicant-Initiated Interview Summary for U.S. Appl. No. 16/176,920 (dated Apr. 1, 2020).

Non-Final Office Action for U.S. Appl. No. 16/176,920 (dated Mar. 6, 2020).

Notification of Transmittal of the International Search Report and the Written Opinion of the International Searching Authority, or the Declaration for International Application Serial No. PCT/US2019/053912 (dated Dec. 18, 2019).

Commonly-assigned, co-pending U.S. Appl. No. 16/697,021 for "Methods, Systems, and Computer Readable Media for Diameter-Peer-Wide Egress Rate Limiting at Diameter Relay Agent (DRA)," (Unpublished, filed Nov. 27, 2019).

"3rd Generation Partnership Project; Technical Specification Group Services and System Aspects; Architecture enhancements to facilitate communications with packet data networks and applications (Release 16)," 3GPP TS 23.682, V16.4.0, pp. 1-30 (Sep. 2019).

"Diameter and Diameter Applications," Alcatel-Lucent, http://infodoc.alcatel-lucent.com/html/0_add-h-f/93-0098-HTML/7750_SR_OS_Triple_Play_Guide/GX-PolicyMgmt.html, pp. 1-40 (Aug. 22, 2019).

"3rd Generation Partnership Project; Technical Specification Group Radio Access Network; NG-RAN; NG Application Protocol (NGAP) (Release 15)," 3GPP TS 38.413, V15.4.0, pp. 1-328 (Jul. 2019).

Commonly-assigned, co-pending U.S. Appl. No. 16/453,955 for "Methods, Systems, and Computer Readable Media for Producer

(56) References Cited

OTHER PUBLICATIONS

Network Function (NF) Service Instance Wide Egress Rate Limiting at Service Communication Proxy (SCP)," (Unpublished, filed Jun. 26, 2019).
"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).
"3rd Generation Partnership Project; Technical Specification Group Core Network and Terminals; 5G System; Restoration Procedures (Release 16)," 3GPP TS 23.527, V16.0.0, pp. 1-19 (Jun. 2019).
"3rd Generation Partnership Project; Technical Specification Group Core Network and Terminals; Numbering, addressing and identification (Release 15)," 3GPP TS 23.003, V15.7.0, pp. 1-131 (Jun. 2019).
"Class of Service Feature Guide (Routers and EX9200 Switches)," Junos® OS, Juniper Networks, pp. 1-1530 (Apr. 10, 2019).
Commonly-assigned, co-pending U.S. Appl. No. 16/356,446 for "Methods, Systems, and Computer Readable Media for Locality-Based Selection and Routing of Traffic to Producer Network Functions (NFs)," (Unpublished, filed Mar. 18, 2019).
"3rd Generation Partnership Project; Technical Specification Group Services and System Aspects; System Architecture and 5G; Stage 2 (Release 16)," 3GPP TS 23.501, V16.0.0, pp. 1-318 (Mar. 2019).
Commonly-assigned, co-pending U.S. Appl. No. 16/369,691 for "Methods, System, and Computer Readable Media for Handling Multiple Versions of Same Service Provided by Producer Network Functions (NFs)," (Unpublished, filed Mar. 29, 2019).
Penttinen, "5G Explained: Security and Deployment of Advanced Mobile Communications," Chapter 6, Section 6.3.8 NRF, 2 pages (Feb. 2019).
"Oracle Communications Diameter Signaling Router," Release Notice, Release 8.3, E93179 Revision 02, Oracle, pp. 1-98 (Dec. 2018).
"3rd Generation Partnership Project; Technical Specification Group Network and Terminals; 5G Systems; Network Function Repository Services; Stage 3 (Release 15)," 3GPP TS 29.510, V15.2.0, pp. 1-113 (Dec. 2018).
"3rd Generation Partnership Project; Technical Specification Group Network and Terminals; 5G Systems; Principles and Guidelines for Services Definition; Stage 3 (Release 15)," 3GPP TS 29.501, V15.2.0, pp. 1-66 (Dec. 2018).
"3rd Generation Partnership Project; Technical Specification Group Services and System Aspects; Study on Enhancements to the Service-Based Architecture (Release 16)," 3GPP TR 23.742, V16.0.0, pp. 1-131 (Dec. 2018).
Commonly-assigned, co-pending U.S. Appl. No. 16/176,920 for "Methods, Systems, and Computer Readable Media for Providing a Service Proxy Function in a Telecommunications Network Core Using a Service-Based Architecture," (Unpublished, filed Oct. 31, 2018).
"Addressing 5G Network Function Requirements," Intel® FPGAs and Intel PAC 5G QoS and IPSec Benchmarking, White Paper, pp. 1-8 (Oct. 2018).
"CPS vDRA Configuration Guide," Release 18.3.0 (Restricted Release)(1), Cisco, pp. 1-130 (Sep. 14, 2018).
"How to Do Rate Limiting of Diameter Messages Using NetScaler," Citrix Systems Inc., pp. 1-3 (Sep. 4, 2018).
"5G; 5G System; Technical Realization of Service Based Architecture; Stage 3 (3GPP TS 29.500 version 15.0.0 Release 15)," ETSI TS 129 500, V15.0.0, pp. 1-29 (Jul. 2018).
"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).
"3rd Generation Partnership Project; Technical Specification Group Services and System Aspects; Study on Enhancements to the Service-Based Architecture (Release 16)," 3GPP TR 23.742, V0.2.0, pp. 1-39 (Jun. 2018).
"5G; Procedures for the 5G System (3GPP TS 23.502 version 15.2.0 Release 15)," ETSI TS 123 502 V15.2.0, pp. 1-46 (Jun. 2018).

"Cisco Ultra 5G Packet Core Solution," Cisco, White paper, https://www.cisco.com/c/dam/en/us/products/collateral/routers/network-convergence-system-500-series-routers/white-paper-c11-740360.pdf, pp. 1-11 (2018).
Scholl et al., "An API First Approach to Microservices Development," Oracle, https://blogs.oracle.com/developers/an-api-first-approach-to-microservices-development, pp. 1-12 (Novembers, 2017).
Brown et al., "Service-Based Architecture for 5G Core Networks," Huawei, Heavy Reading, https://www.3g4g.co.uk/5G/5Gtech_6004_2017_11_Service-Based-Architecture-for-5G-Core-Networks_HR_Huawei.pdf, pp. 1-12 (Nov. 2017).
"3rd Generation Partnership Project; Technical Specification Group Services and System Aspects; System Architecture for the 5G System; Stage 2 (Release 15)," 3GPP TS 23.501, V1.5.0, pp. 1-170 (Nov. 2017).
"Pseudo-CR on Service Discovery and Registration using NRF service," Ericsson, 3GPP TSG CT4 Meeting #79, 3GPP TR 29.891—v0.3.0, pp. 1-4 (Aug. 21-25, 2017).
Carlton et al., "HTTP and DNS in a 5G World," https://www.computerworld.com/article/3204594/http-and-dns-in-a-5g-world.html, pp. 1-5 (Jun. 30, 2017).
Benacer et al., "A High-Speed Traffic Manager Architecture for Flow-Based Networking," pp. 1-4 (2017).
"Dynamically Reconfigurable Optical-Wireless Backhaul/Fronthaul with Cognitive Control Plane for Small Cells and Cloud-RANs: D3.1 Analysis of state of the art on scalable control plane design and techniques for user mobility awareness. Definition of 5G-XHaul control plane requirements," European Commission, 5G-XHaul, pp. 1-107 (Jun. 31, 2016).
"Multi-Layer Security Protection for Signaling Networks," Oracle Communications, Oracle white paper, pp. 1-9 (Jan. 2016).
Kantola et al., "Policy-based communications for 5G mobile with customer edge switching," Security and Communication Networks, vol. 9, pp. 3070-3082 (2016).
Fielding et al. "Hypertext Transfer Protocol (HTTP/1.1): Semantics and Content", Internet Engineering Taskforce (IETF) Request for Comments: 7231, IEFT RFC 7231, pp. 1-102 (Jun. 2014).
Preston-Werner, "Semantic Versioning 2.0.0", Oracle, pp. 1-5 (Jun. 2013).
Fajardo et al., "Diameter Based Protocol," Internet Engineering Task Force (IETF) Request for Comments: 6733, pp. 1-152 (Oct. 2012).
Gulbrandsen et al, "A DNS RR for specifying the location of services (DNS SRV)," RFC 2782, pp. 1-12 (Feb. 2000).
Commonly-assigned, co-pending U.S. Appl. No. 17/356,451 for "Methods, Systems, and Computer Readable Media for Resolution of Inter-Network Domain Names" (Unpublished, filed Jun. 23, 2021).
Notification of Transmittal of the International Search Report and the Written Opinion of the International Searching Authority, or the Declaration for U.S. Patent Application Serial No. PCT/US2021/020120 (dated Jun. 1, 2021).
Notification of Transmittal of the International Search Report and the Written Opinion of the International Searching Authority, or the Declaration for U.S. Patent Application Serial No. PCT/US2021/020122 (dated Jun. 1, 2021).
"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).
"3rd Generation Partnership Project; Technical Specification Group Core Network and Terminals; Numbering, addressing and identification; (Release 17)," 3GPP TS 23.003, V17.1.0, pp. 1-143 (Mar. 2021).
"3rd Generation Partnership Project; Technical Specification Group Core Network and Terminals; 5G System; Public Land Mobile Network (PLMN) Interconnection; Stage 3 (Release 17)," 3GPP TS 29.573, V17.0.0, pp. 1-100 (Mar. 2021).
Nokia et al., "Discussion paper on authorization for Model D Indirect communications", 3GPP TSG SA WG3; S3-194380 (Nov. 11, 2019).
Notice of Allowance and Fee(s) Due for U.S. Appl. No. 16/697,021 (dated Jun. 21, 2021).

(56) References Cited

OTHER PUBLICATIONS

Non-Final Office Action for U.S. Appl. No. 16/356,446 (dated Jun. 16, 2021).
Notice of Publication for International Application Serial No. PCT/US2020/061885 (dated Jun. 3, 2021).
Notice of Allowance and Fee(s) Due for U.S. Appl. No. 17/001,599 (dated May 17, 2021).
Advisory Action for U.S. Appl. No. 16/697,021 (dated May 7, 2021).
Applicant-Initiated Interview Summary for U.S. Appl. No. 17/001,599 (dated May 5, 2021).
Notification of Transmittal of the International Search Report and the Written Opinion of the International Searching Authority, or the Declaration for International Application Serial No. PCT/US2020/065765 (dated Apr. 15, 2021).
Notice of Allowance and Fee(s) Due for U.S. Appl. No. 16/555,817 (dated Mar. 24, 2021).
International Search Report and Written Opinion for Patent Cooperation Treaty Application Serial No. PCT/US2020/061885 (dated Feb. 4, 2021).
International Search Report and Written Opinion for Patent Cooperation Treaty Application Serial No. PCT/US2020/057712 (dated Feb. 2, 2021).
Cheshire, S. et al., "Apple's DNS Long-Lived Queries protocol draft-sekar-dns-llq-06," Internet Engineering Task Force (IETF), pp. 1-26 (Aug. 23, 2019).
Final Office Action for U.S. Appl. No. 16/697,021 (dated Feb. 2, 2021).
Applicant-Initiated Interview Summary for U.S. Appl. No. 16/697,021 (dated Jan. 26, 2021).
"3rd Generation Partnership Project; Technical Specification Group Services and System Aspects; Procedures for the 5G System (5GS); Stage 2 (Release 16)," 3GPP TS 23.502, V16.7.0, pp. 1-603 (Dec. 2020).
"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).
"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).
"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).
Commonly-assigned, co-pending U.S. Appl. No. 17/156,149 for "Methods, Systems, and Computer Readable Media for Optimized Routing of Messages Relating to Existing Network Function (NF) Subscriptions Using an Intermediate Forwarding NF Repository Function (NRF)," (Unpublished, filed Nov. 9, 2020).
Commonly-assigned, co-pending U.S. Appl. No. 17/102,404 for "Methods, Systems, and Computer Readable Media for Policing Access Point Name-Aggregate Maximum Bit Rate (APN-AMBR) Across Packet Data Network Gateway Data Plane (P-GW DP) Worker Instances," (filed Sep. 23, 2020).
"5G; System architecture for the 5G System (5GS) (3GPP TS 23.501 version 15.6.0 Release 15)," ETSI TS 123 501, V15.6.0, pp. 1-168 (Oct. 2019).
"5G; 5G System; Network function repository services; Stage 3 (3GPP TS 29.510 version 15.5.1 Release 15)," ETSI TS 129 510, V15.5.1, pp. 1-132 (Oct. 2019).
"5G; 5G System; Technical Realization of Service Based Architecture; Stage 3 (3GPP TS 29.500 version 15.5.0 Release 15)," ETSI TS 129 500, V15.5.0, pp. 1-40 (Sep. 2019).
Huawei, "eSBA: reselection of producer instance," 3GPP TSG-SA2 Meeting #132, pp. 1-2 (Apr. 12, 2019).
Docomo, "Update Solution 4 for implicit registration," SA WG2 Meeting #129, pp. 1-2 (Oct. 15-19, 2018).
Notification of Transmittal of the International Search Report and the Written Opinion of the International Searching Authority, or the Declaration for International Application No. PCT/US2021/024000 (dated Jun. 24, 2021).

\* cited by examiner

METHODS, SYSTEMS, AND COMPUTER READABLE MEDIA FOR ENABLING TRANSPORT QUALITY OF SERVICE (QOS) IN 5G NETWORKS

TECHNICAL FIELD

The subject matter described herein relates to QoS in 5G networks. More particularly, the subject matter described herein relates to methods, systems, and computer readable media for enabling transport QoS in 5G networks.

BACKGROUND

In 5G telecommunications networks, a network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is a combination of Internet protocol (IP) address and port number on a network node that hosts a producer NF. Producer NFs register with a network function repository function (NRF). The NRF maintains an NF profile of available NF instances and their supported services. Consumer NFs can subscribe to receive information about producer NF instances that have registered with the NRF.

One example of an NF that provides services to user equipment (UE) devices, such as Internet of Things (IoT) devices, is the access and mobility management function (AMF). The AMF provides registration management, connection management, reachability management, mobility management, and other services for UE devices. The AMF serves as the point of contact between the radio access network and the remaining nodes in the 5G core network. The AMF also serves as the point of access to network slice services.

Network slicing is a service provided in 5G networks where network resources are logically allocated in portions or slices for use by UE devices. Each network slice may provide particular capabilities or services to a UE. A network slice instance is defined as a set of network functions and the resources for the network functions which are arranged and configured to form and meet a specific set of network requirements or characteristics. For example, a network slice instance for access network services may be resources of a virtualized g-Node B and AMF to provide access network services for a UE. A network slice instance for a core network service may include resources of a virtualized NRF and network exposure function (NEF) configured to provide core network services for a UE, such as an IoT.

In 5G telecommunications networks, it may be desirable to implement policies that guarantee quality of service for different traffic classes. Third Generation Partnership Project (3GPP) Technical Specification (TS) 29.500 defines an SBI-message-priority mechanism where 5G consumer NFs can set a parameter referred to as 3GPP-SBI-message-priority in the hypertext transfer protocol (HTTP) header in a message that is used to indicate the priority of the message. Section 6.8.1 of 3GPP TS 29.500 states that the service based interface (SBI) message priority can be used to provide guidance to a 5G core network function acting as an HTTP/2 client, server, or proxy would make throttling decisions relating to overload control. The priority information may also be used for routing and proxies. A server may also use the priority information to process higher priority requests before lower priority requests.

The priority mechanism is the above mentioned 3GPP-SBI-message-priority parameter that is carried in a custom HTTP header and is used to carry message priority between the client and the server. The custom HTTP header enforces the message priority end to end between the client and the server. HTTP/2 clients and servers are required to support the custom HTTP header to enforce the priority mechanism. The 3GPP-SBI-message-priority parameter carried in the custom HTTP header can be used to set message level priority or stream priority. Message level priority is used by an HTTP client or server to indicate the priority of a request from the client or response from the server. Stream level priority is used to prioritize streams for transmitting frames when there is limited capacity for sending and to express how the sender would prefer the peer to allocate the resources when managing concurrent streams. Setting a stream priority ensures a priority treatment to a message between two endpoints of an HTTP/2 connection.

One problem with using the SBI message priority HTTP header mechanism defined in 3GPP TS 29.500 is that it requires nodes to support layer 7 in order to implement the priority mechanism. Layer 3/4 devices, such as network routers, may not support layer 7 priority. In addition, even if such intermediate nodes could be configured to support layer 7, parsing layer 7 data requires additional processing and thus impacts performance. Most intermediate nodes limit routing decisions based on Open Systems Interconnect (OSI) layers 3 and 4. As a result, at layers 3 and 4, all 5G messages are treated the same by intermediate nodes, such as routers. Routers may not be able to provide the requested priority between a consumer and a producer NF. In addition, when a router is in a path between different NFs that serve different 5G network slices, the router is not capable of differentiating traffic that may require different priority processing. During congestion, the router cannot apply a congestion policy without a distinguisher at the transport or network layer. As a result, traffic for network slices that expect ultra-low latency may be impermissibly delayed.

Accordingly, in light of these difficulties, there exists a need for methods, systems, and computer readable media for enabling transport quality of service in 5G networks.

SUMMARY

A method for enabling 5G transport quality of service (QoS) includes receiving a service discovery request from a consumer network function (NF) or service communications proxy (SCP). The method further includes accessing a 5G transport QoS policy database and determining that a 5G transport QoS policy applies to the service discovery request. The method further includes, in response to determining that a 5G transport QoS policy applies to the service discovery request, generating a service discovery response message and inserting a network layer QoS value for implementing the policy in the discovery response message. The method further includes transmitting the service discovery response message to the consumer NF or SCP.

According to another aspect of the subject matter described herein, receiving a service discovery request from a consumer NF or SCP includes receiving the service discovery request from the consumer NF.

According to yet another aspect of the subject matter described herein, receiving the service discovery request from the consumer NF or SCP includes receiving the service discovery request from the SCP.

According to another aspect of the subject matter described herein, accessing the 5G transport QoS database includes accessing the 5G QoS transport quality database using a service identifier extracted from the service discovery request.

According to another aspect of the subject matter described herein, the service identifier identifies a service endpoint and an application programming interface (API) resource associated with the service endpoint.

The method of claim 1 wherein accessing the 5G transport QoS policy database includes accessing the 5G transport QoS policy database using a source public land mobile network (PLMN) identifier.

According to another aspect of the subject matter described herein, the network layer QoS value comprises a differentiated services code point (DSCP) value.

According to another aspect of the subject matter described herein, the network layer QoS value comprises an Internet protocol (IP) type of service (ToS) value.

According to another aspect of the subject matter described herein, the method for providing 5G transport QoS includes using the network layer QoS value to provide transport QoS for 5G messages exchange between the consumer NF or SCP and a producer NF that provides the service requested in the service discovery request.

According to another aspect of the subject matter described herein, using the network layer QoS value to provide transport QoS for the 5G messages includes applying QoS corresponding to the QoS value to network layer messages that carry the 5G messages.

According to another aspect of the subject matter described herein, a system for enabling 5G transport quality of service (QoS) includes a network function repository function (NRF) including at least one processor and a memory. The system further includes a 5G transport quality of service QoS database located in the memory. The system further includes a 5G QoS enabled service discovery manager implemented by the at least one processor for receiving a service discovery request from a consumer network function (NF) or service communications proxy (SCP), accessing a 5G transport QoS policy database and determining that a 5G transport QoS policy applies to the service discovery request; and, in response to determining that a 5G transport QoS policy applies to the service discovery request, generating a service discovery response message and inserting a network layer QoS value for implementing the policy in the discovery response message, and transmitting the service discovery response message to the consumer NF or SCP.

According to another aspect of the subject matter described herein, the 5G QoS enabled service discovery manager is configured to receive the service discovery request from the consumer NF.

According to another aspect of the subject matter described herein, the 5G QoS enabled service discovery manager is configured to receive the service discovery request from the SCP.

According to another aspect of the subject matter described herein, the 5G QoS enabled service discovery manager is configured to access the 5G QoS transport quality database using a service identifier extracted from the service discovery request.

According to another aspect of the subject matter described herein, the service identifier identifies a service endpoint and an application programming interface (API) resource associated with the service endpoint.

According to another aspect of the subject matter described herein, the 5G QoS enabled service discovery manager is configured to access the 5G transport QoS policy database using a source public land mobile network (PLMN) identifier.

According to another aspect of the subject matter described herein, the network layer QoS value comprises a differentiated services code point (DSCP) value.

According to another aspect of the subject matter described herein, the network layer QoS value comprises an Internet protocol (IP) type of service (ToS) value.

According to another aspect of the subject matter described herein, the NF or SCP is configured to tag network layer packets with the QoS value to indicate to intermediate routers of a QoS requested for 5G messages.

According to another aspect of the subject matter described herein, a non-transitory computer readable medium having stored thereon executable instructions that when executed by a processor of a computer control the computer to perform steps comprising. The steps include receiving a service discovery request from a consumer network function (NF) or service communications proxy (SCP). The steps further include accessing a 5G transport QoS policy database and determining that a 5G transport QoS policy applies to the service discovery request. The steps further include in response to determining that a 5G transport QoS policy applies to the service discovery request, generating a service discovery response message and inserting a network layer QoS value for implementing the policy in the discovery response message. The steps further include transmitting the service discovery response message to the consumer NF or SCP.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
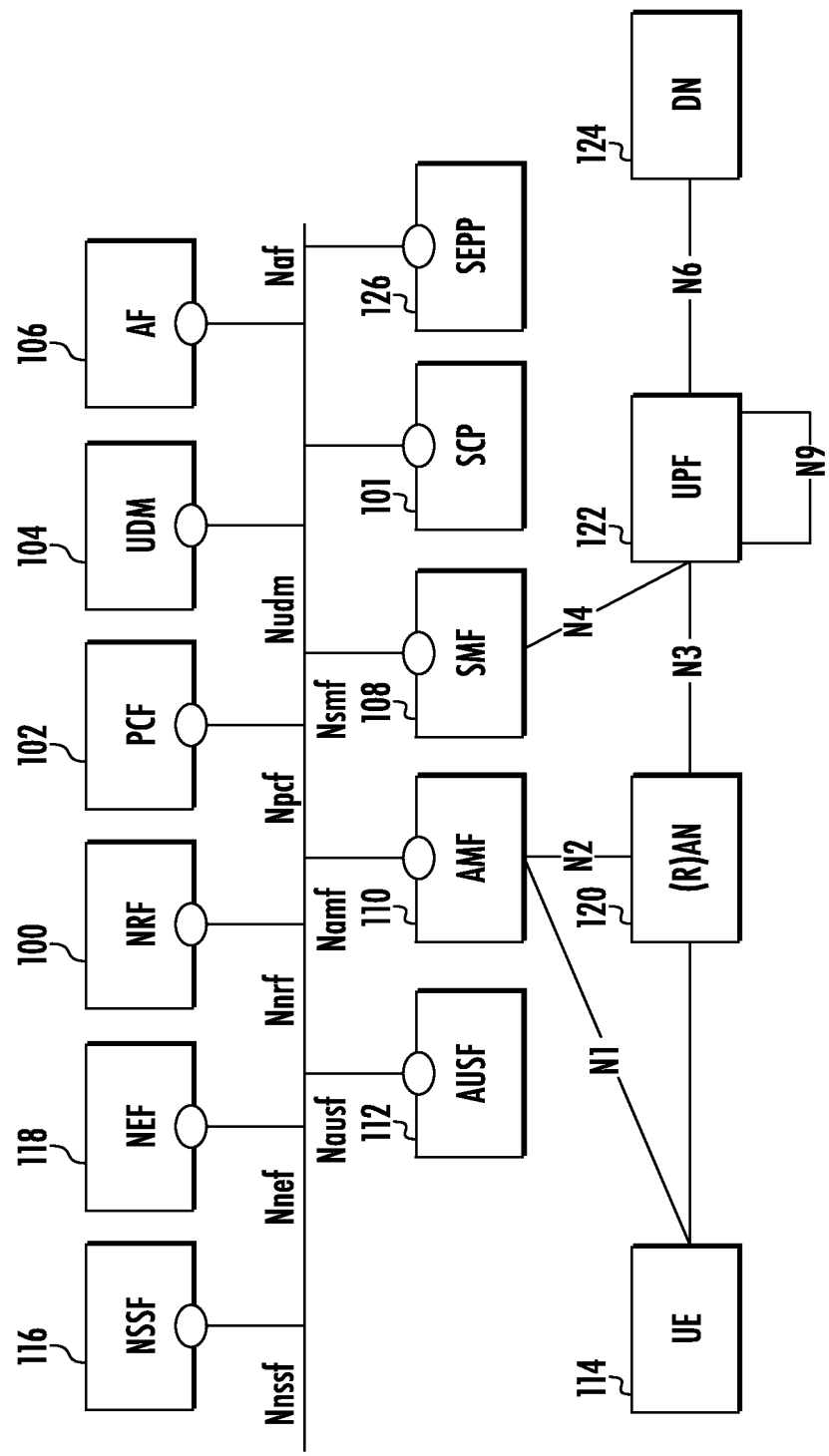
FIG. 1 is a network diagram illustrating an exemplary 5G network architecture.

FIG. 1 is a block diagram illustrating an exemplary 5G system network architecture. In FIG. 1, the network includes NRF 100 and a service communications proxy (SCP) 101. As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NFs. In addition, SCP 101 may perform load balancing of connections between consumer and producer NFs.

NRF 100 is a repository for NF profiles. In order to communicate with a producer NF, a consumer NF or an SCP must obtain the NF profile from NRF 100. The NF profile is a JavaScript object notation (JSON) data structure. The NF profile definition includes at least one of a fully qualified domain name (FQDN), an Internet protocol (IP) version 4 (IPv4) address or an IP version 6 (IPv6) address.

As will be described in more detail below, NRF may store 5G transport QoS policy information for implementing 5G transport QoS between consumer and producer NFs. In one implementation, NRF 100 will maintain this information in a 5G transport QoS policy database and may provide 5G transport QoS information from the database in response to service discovery requests from consumer NFs.

In FIG. 1, any of the nodes (other than SCP 101 and NRF 100) can be either consumer NFs or producer NFs, depending on whether they are consuming or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between AMF 110 and PCF 102. AMF 110 performs mobility and registration management operations similar to those performed by a mobility management entity (MME) in 4G networks. AMF 110 also serves as the access point for network slice services. AMF 110 may also perform AMF selection to select the serving AMF that will provide access to the network slice services requested by a UE during registration.

An authentication server function (AUSF) 112 performs authentication services for user equipment (UEs), such as UE 114, seeking access to the network.

A network slice selection function (NSSF) 116 provides network slice subnet availability information (NSSAI) and NS selection services for devices seeking to access specific network capabilities. NSSF 116 may obtain AMF loading information from an NRF and NSSAI availability information from AMFs. NSSF 116 may store the AMF loading information and NSSAI availability information in an AMF selection database maintained by NSSF 116. When NSSF 116 receives an NSSAI selection request from an AMF, NSSF 116 may utilize the stored AMF loading and NSSAI availability information to compute an AMF relevance score and a weight for each AMF capable of supporting the network slice services requested by a UE seeking access to network slice services. NSSF 116 may generate a prioritized list of AMFs capable of providing the requested services and the corresponding weights and communicate the list to the requesting AMF. The requesting AMF may then use the prioritized list of AMFs and the weights to select an AMF for providing access to the requested network slice services.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionalities for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Service edge protection proxy (SEPP) 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse a minimum of two SEPP functions, one for the home PLMN and the other for the foreign PLMN.

As stated above, it is desirable to provide transport quality of service for 5G network traffic. One particular application for such transport quality of service is network slicing. Network slicing is used in 5G networks to provide service based on the target functionality. Examples of such functionality include ultra-reliable low latency communications, massive IoT, and emergency services. When exchanging 5G messages, a consumer NF may communicate with a service hosted on a dedicated producer NF for a slice, shared producer NFs among different slices, or producer NFs indifferent PLMNs. Accordingly, it is important for consumer NFs to be able to ensure that transport priority is set for 5G messages so that the messages can be handled accordingly by intermediate network nodes before the messages reach the producer NF and for messages that travel from producer NF back to the consumer NFs. However, requiring consumer NFs to individually set 5G transport priority is burdensome on the consumer and consumer NFs may not be in the best position to know what type of QoS policy to define for a given message.

Network devices, such as routers have fixed resources. Thus, they have limited capacity and performance. For various technical and operational reasons, there are shared network resources that are in the path of multiple network slices and network functions, e.g., common network routers.

One mechanism that can be used to provide transport quality of service at a network router is the differentiated services field and in particularly, the differentiated services code point (DSCP) portion of the differentiated services field in IP version 4 and IP version 6 headers. The differentiated services field is defined in Internet Engineering Task Force (IETF) RFC 2474. The DSCP portion of the differentiated services field adds to a per hop behavior (PHB), which is defined as an externally observable forwarding treatment that is to be applied at a differentiated services compliant node to a behavior aggregate. Thus, the DSCP field is an example field that can be used by network routers to provide differentiated services for different packets.

The differentiated services field replaces the IP version for type of service (ToS) field. The IP ToS field can also be used by compliant routers to identify packets associated with different service classes and to provide differentiated treatment for such packets based on the ToS values.

3GPP TS 23.501 describes DSCP handling for user data but does not provide guidelines or recommendations for control traffic. 3GPP TS 29.500, Section 6.8.8 states the following regarding DSCP values:

Multiple HTTP/2 connections between two HTTP/3 endpoints are necessary: 1 per DSCP value. All messages sent over a connection are assigned the same traffic class and receive the same DSCP marking.

The 3GPP-SBI-message-priority value shall be considered in the selection of the appropriate connection to send the message.

These loosely defined criteria bring ambiguity as to when and how client NF instances shall perform DSCP marking for a given service of a producer NF. For example, for a 3GPP-SBI-message-priority with a value of 5 to a service destined to a producer NF in the same geographic location versus an NF in a different PLMN. Similarly, when NF slices are present, there is no guidance as to how the DSCP will be used by the common NF when routing messages to a given NF associated with a particular network slice. Configure and mappings between DSCP values and priority policies at each consumer NF instance is troublesome and error prone.

The subject matter described herein provides a centralized solution for network operators to establish custom policies for consumer and producer NFs to set the appropriate DSCP bits in the differentiated services field of selected messages. The subject matter described herein also enables a network operator to manage SBI priority parameters and other fields that may be used to differentiate packets for providing different qualities of service. According to the subject matter described herein, the NRF defined in 3GPP TS 29.510 may serve as a centralized location where the network operator defines customized policies that includes appropriate DSCP settings to be used by each client/consumer NF when requesting service from a given producer NF. The customized policy may be communicated by the NRF to the consumer NF in vendor-specific extensions of messages communicated from the NRF to the consumer NFs. The vendor specific extensions are defined in Section 6.6.3 of 3GPP TS 29.500. According to 3GPP TS 29.500, information elements sent on 3GPP 5G core (5GC) APIs should be extensible with vendor specific data. The definition of JSON data structure is using OpenAPI as the Interface Definition Language allows extension by default of any JSON object with additional member elements. Such vendor specific extensions can be used in requests and responses between the NRF and service consumers to communicate values needed to enforce transport QoS and 5G networks.

At the consumer NFs, behaviors are defined to enforce policies corresponding to the DSCP values. A custom behavior can be enabled through either of the following modes:

A consumer NF that supports vendor-specific extensions and thus applies/manages the DSCP value for the corresponding service and NF.

If the client or consumer NF does not support vendor-specific extensions, a proxy model using the SCP can be used to enable the DSCP for NFs that do not support vendor specific extensions.

As stated above, DSCP values can be used to define per hop behaviors, which define packet forwarding properties that a router applies to a particular class of traffic. Different per hop behaviors can be defined to offer, for example, low loss or low latency services. As defined in RFC 2474, the DSCP value is the high order six bits of the IP version 4 type of service field and the IP version 6 traffic class field.

The DSCP parameter value can be set using socket options in Linux or other operating systems that use sockets to define TCP/IP endpoints. For example, in Linux, the setsockopt command can be used to set a value for option IP ToS or IPv6 T class. Standard ToS flags that are defined include:

IP ToS low delay to minimize delays for interactive traffic;

IP ToS throughput to optimize throughput;

IP ToS reliability to optimize reliability.

In addition to the standard values, a customized value can be set using a netfilter rule. For example, for destination IP address 10.178.254.160, port 10240, set DSCP value of 20 (AS 22) iptables -A OUTPUT-t mangle-p tcp-d 10.178.254.160-dport 10240-j DSCP-set-dscp 0×14 Thus, an NRF can instruct a consumer NF to set DSCP value using any of these mechanisms.

As described above, the subject matter described herein enables a network operator to define custom policies to inform consumer NFs about which DSCP value to apply for a given service and/or NF instance. For example, one policy may be one that services UDM_xxx and the endpoint is atlanta.oracle.com, set the DSCP value to 26. The custom DSCP policy configured by the network operator is optional and has no functional impact on existing 5G functional flows. Only NFs that utilize this optional feature will leverage its benefits to set up message flows to implement quality of service. In other words, the mechanism described herein is backward compatible with NFs that do not support the new quality of service mechanism.

As described above, the policies that are configured by the network operator may be set at the NRF. The NRF may map DSCP values to a given service end point or set of end points. Table 1 shown below illustrates an example of policy rules and corresponding DSCP values that may be configured at the NRF.

TABLE 1

Example 5G Transport Policies Maintained at an NRF

| Policy Rule | Policy Value | API Resource(s) | DSCP value | Comment |
|---|---|---|---|---|
| Endpoint IP Only | Range or specific IP: e.g. 10.75.0.0/16 | nudm-sdm/* | 20 | Any NF instance publishing a given IP address as an endpoint for subscriber data management (SDM) service of user data management (UDM) NF. |
| Endpoint FQDN only | Wild card or absolute value: nudm-sdm.atlanta.oracle.com | nudm-sdm/v1/*/sdm-subscriptions | 24 | Matching service FQDN only for SDM subscription resource of UDM NF. |
| PLMN | Source PLMN: [<mcc>, <mnc>] e.g. [91, *] or [91, 05] Target PLMN: [01, *] or [01, 05] | nudm-sdm/* | 30 | UDM_SDM service between given range of PLMN ID(s) |
| InterPlmnFqdn | Source PLMN: [<mcc>, <mnc>] e.g. [91, *] or [91, 05] Wild card or absolute value of target FQDN: *vzw.com | * | 20 | Any service invoked between source PLMN and target PLMN FQDN domain |

In Table 1, policy rules are defined within which policy values and/or API resources map to DSCP values. For example, the first policy in Table 1 maps an IP endpoint 10.75.0.0/16 and corresponding API resource nudm-sdm/* to a DSCP value of 20. This means that any UDM NF instance publishing this IP address as the service endpoint for SDM service will be assigned a DSCP value of 20. The second policy rule in Table 1 maps a fully qualified domain name (FQDN) of nudm-sdm.atlanta.oracle.com and specific API resources to a DSCP value of 24. The third policy in Table 1 maps udm-sdm service for a range of PLMNs to a DSCP value of 30. The fourth policy rule maps any service implemented between a given source PLMN and destination PLMN to a DSCP value of 20.

It should be noted that the example policies in Table 1 are for illustrative purposes only and that the subject matter described herein allows network operators to define any customized policy at the NRF and map that policy to a DSCP or other network layer QoS value. As will be described in detail below, when a consumer NF requests service, the service request typically provides the target PLMN and requestor PLMN during the service discovery process. These parameters may be used by the NRF to perform a lookup in the 5G transport QoS database to determine the DSCP value to apply to a message or group of messages. The NRF stores the 5G transport QoS policy mapping database in its persistent memory.

Figure 2:
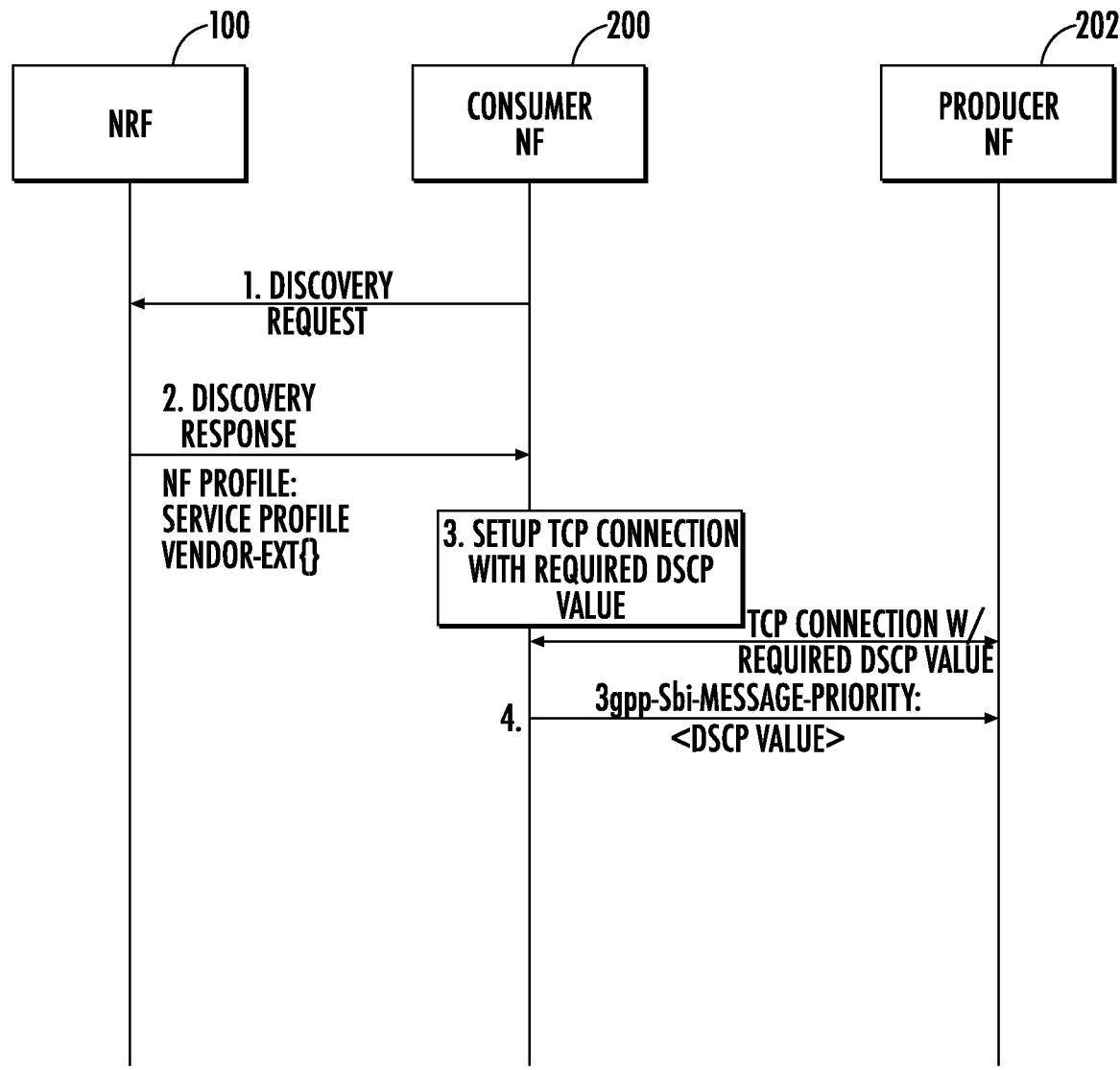
FIG. 2 is a message flow diagram illustrating the communication of a differentiated services code point (DSCP) value to a consumer NF and the use of the DSCP value to prioritize traffic between the consumer NF and a producer NF.

FIG. 2 is a message flow diagram illustrating exemplary messages that are exchanged between a consumer NF, an NRF, and a producer NF and implementing the customized policies described herein. Referring to FIG. 2, in line 1 of the message flow diagram, consumer NF 200 sends a service discovery request to NRF 100. The service discovery request identifies the service requested by consumer NF 200 and also identifies consumer NF 200. NRF 100 performs a lookup in its 5G transport QoS policy database to identify the policy to apply to the service. In this example, it is assumed that a policy is configured in the database and that a DSCP value is extracted from the database. Accordingly, NRF 100 places the DSCP value in a vendor specific extension of a discovery response message and, in line 2, transmits the discovery response message with the vendor specific extension, including the DSCP value to consumer NF 200. In this example, it is assumed that consumer NF 200 supports the vendor specific extension and performs the following steps:

1. Add "3GPP SBI-Message-Priority" header in HTTP2 request event to publish the DSCP value as SBI message priority value.
2. Look for connection [target IP+port] initiated with the required DSCP value:
    If not found:
        Use low-level socket APIs to set the DSCP value when initiating an HTTP2 (TCP) connection (step 3 in FIG. 2) with the producer NF service.
        On such connections, only messages pertaining to that service and DSCP value should be initiated.
        This requirement is substantial when producer NF 202 has multiple services deployed and all services of producer NF 202 share the same common front end FQDN (e.g. API gateway's FQDN).
    If found, use that connection.
3. If consumer NF 200 does not support socket APIs to set the DSCP value, then NRF 100 will use NetFilter (i.e. iptables) to set up a rule for the "OUTPUT" chain in the "mangle" table to set up DSCP for the destination IP address and port with the protocol set as TCP.
    In this case, if producer NF 202 has multiple services hosted on similar IP address and port pair, then the DSCP value will be set for all packets destined to that endpoint.

In line 4, consumer NF 200 and producer NF 202 exchange service traffic over the TCP connection and use the DSCP value in the service traffic. Initial service messages from consumer NF 200 contains the DSCP value as the 3GPP SBI message priority header whereas subsequent messages may have same or higher SBI message priority value based on local policy. Intermediate routers use the DSCP value to provide transport QoS for the 5G traffic carried in the network (IP) layer packets.

Figure 3:
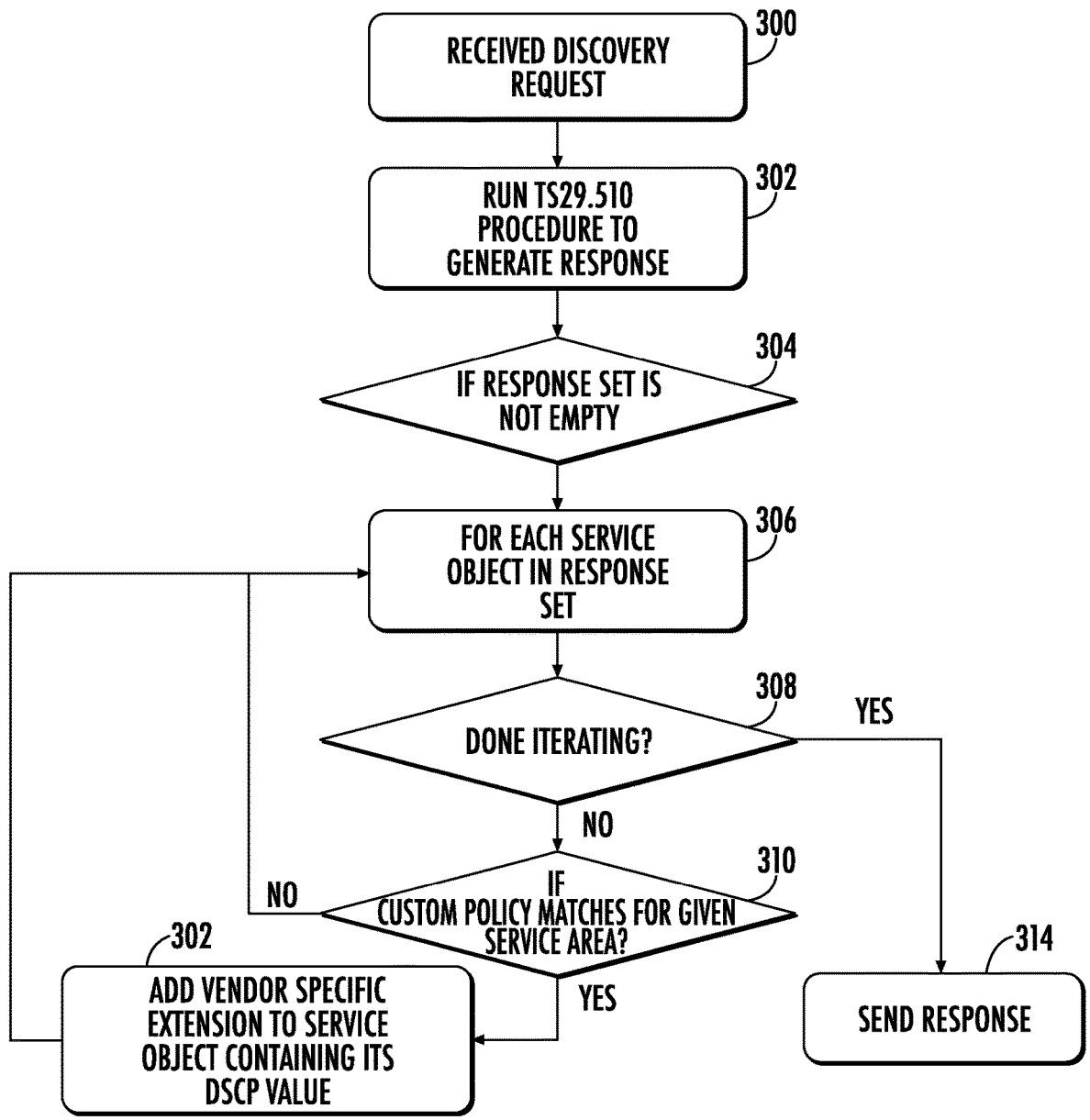
FIG. 3 is a flow chart illustrating an exemplary process that may be implemented by an NRF in responding to a service discovery request from a consumer NF and communicating a DSCP value to the consumer NF in a discovery response.

FIG. 3 is a flow chart illustrating exemplary steps performed by NRF 100 in receiving a service discovery request from a consumer NF, such as consumer NF 200 illustrated in FIG. 2. Referring to FIG. 3, in step 300, NRF 100 receives the service discovery request. In step 302, NRF 100 runs the TS 29.510 procedure to generate a service discovery response. In step 304, if the response set is not empty, control proceeds to step 306, 308, 310, and 312 where NRF 100 determines whether a custom policy is defined for the service object and, if so, adds a vendor specific extension to each matching NF service object containing the DSCP value. Determining whether a custom policy is defined may include performing a lookup in the 5G transport QoS database based on parameters in the service discovery request. In one example, the NRF may run service logic to identify vendor-specific extensions configured by the network operator. The vendor-specific extensions may be of the form:

```
"vendorSpecific-nnnnnnn":{
    dscp:<number>.
}
```

In the above-example, nnnnnn is an IANA-assigned code for a particular network equipment vendor. For example, the code 111 is for Oracle, and 323 is for Tekelec. The <number>parameter holds to DSCP value to be applied for the connection. If multiple overlapping policies apply to a given service query, in one example, the NRF selects the DSCP value based on local policy and returns the DSCP value in the service discovery response.

Once all of the vendor specific extensions and DSCP values have been added to the response, control proceeds to step 314 where NRF 100 sends the response to consumer NF 200. Once a TCP/IP connection is set up, the DSCP value assigned to the service by NRF 100 can be used to mark packets transmitted over the connection. Intermediate switches and routers will use the DSCP value to identify the service class of received packets and provide the appropriate quality of service.

Figure 4:
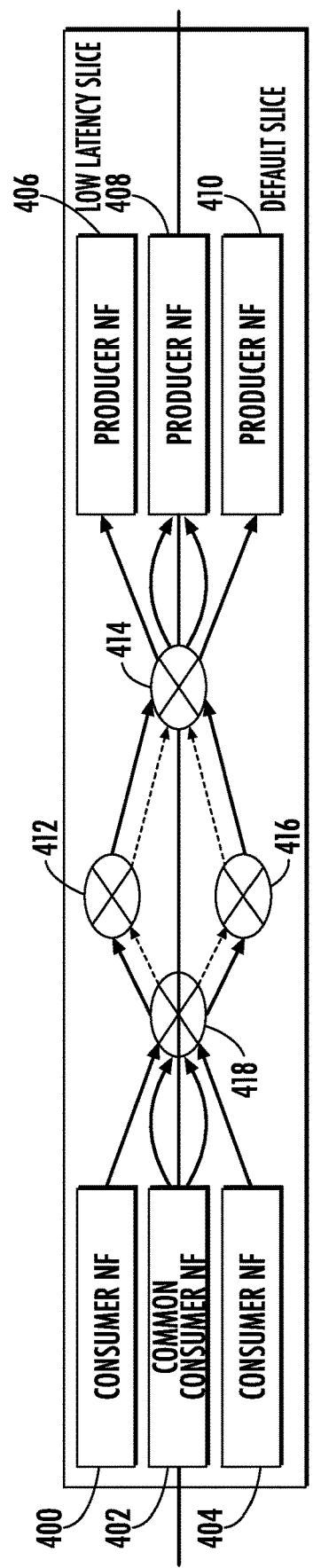
FIG. 4 is a network diagram illustrating consumer NFs and producer NFs connected to each other by intermediate routers and implementing different network slices.

FIG. 4 illustrates producer NFs and consumer NFs connected via intermediate routers. Referring to FIG. 4, consumer NFs 400, 402, and 404 are connected to producer NFs 406, 408, and 410 via intermediate routers 412, 414, 416, and 418. Consumer NFs 400, producer NF 406, and intermediate router 412 are exclusively part of a low latency slice. Consumer NF 404, intermediate router 416, and producer NF 410 are part of a default slice. Consumer NF 402, intermediate routers 414 and 418, and producer NF 408 are shared between the low latency and default slices. If the consumer and producer NFs support the 5G QoS marking of packets as described above, intermediate routers 412, 414, 416, and 418 can provide the required transport QoS for 5G traffic consistent with the policies defined by the network operator in the NRF.

Figure 5:
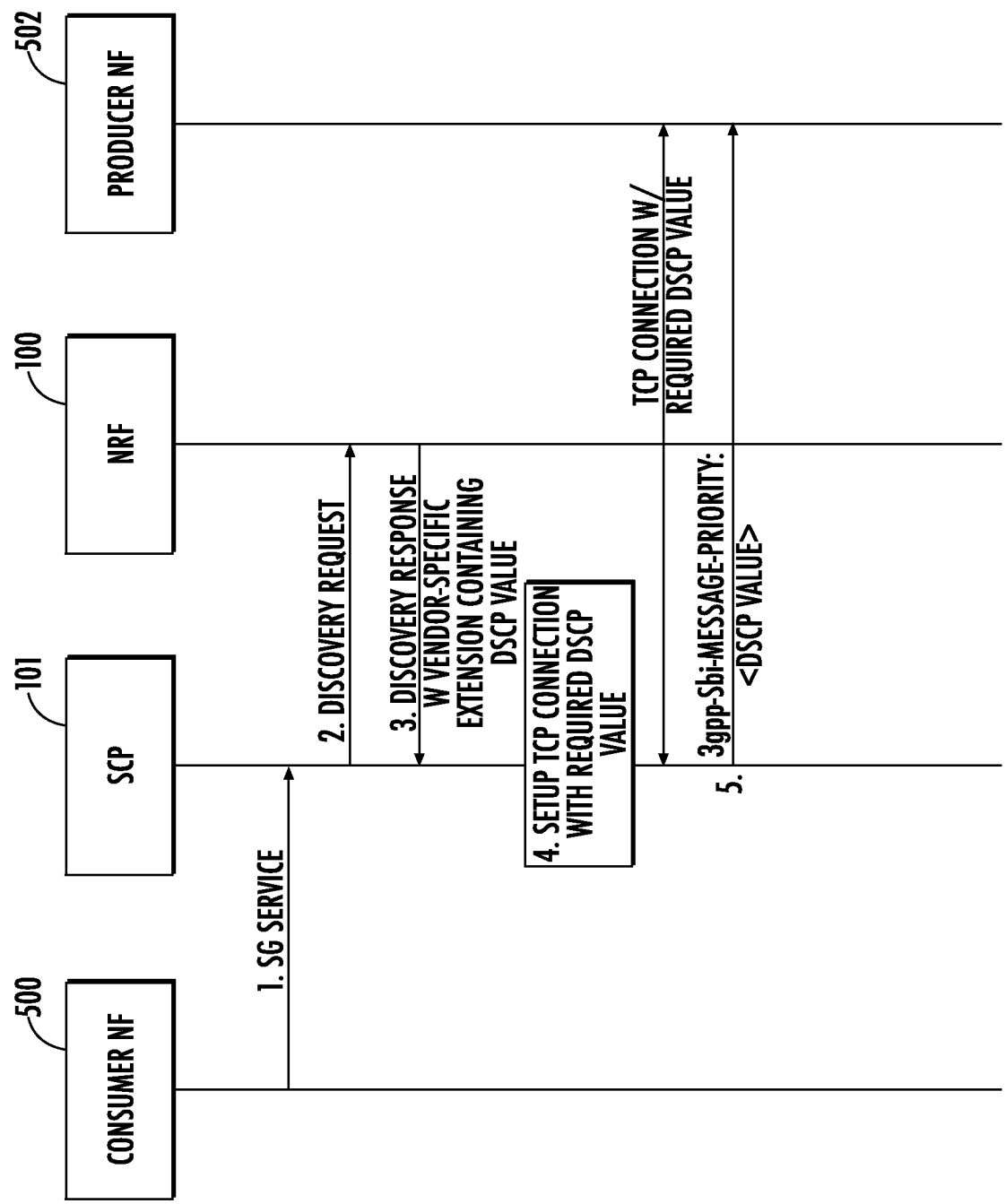
FIG. 5 is a message flow diagram illustrating exemplary messaging associated with communicating a DSCP value to a service communications proxy (SCP) and the use of the DSCP value for indirect communications between the SCP and a producer NF.

In cases where clients do not support the vendor specific extensions for communicating DSCP values, the differential quality of service can be implemented between an SCP and a producer NF that provides the service. The quality of service will be implemented between the SCP and the producer NF, rather than between the consumer NF and the producer NF. Discovery is also delegated to the SCP. FIG. 5 illustrates the procedure when the consumer NF does not support the vendor specific extensions. In FIG. 5, in line 1 of the message flow diagram, consumer NF 500 sends a 5G service request message to SCP 101. In line 2, in response to the 5G service request message, SCP 101 sends aservice discovery request to NRF 100. NRF 100 performs a lookup in its 5G transport QoS policy database and identifies a DSCP value that should be assigned to the service. In line 3, NRF 100 returns the DSCP value to SCP 101 in a vendor specific extension.

In line 4 of the message flow diagram, SCP 101 establishes a TCP connection with producer NF 502 with the required DSCP value. In line 5, service traffic is exchanged between SCP 101 and producer NF 502 with the required DSCP value in individual packets. Initial service messages from SCP contains the DSCP value as the 3GPP SBI message priority header whereas subsequent messages may have same or higher SBI message priority value based on SCP local policy. Intermediate routers will extract the DSCP values from the IP headers and use the DSCP values to provide differential quality of service for packets associated with different services.

Figure 6:
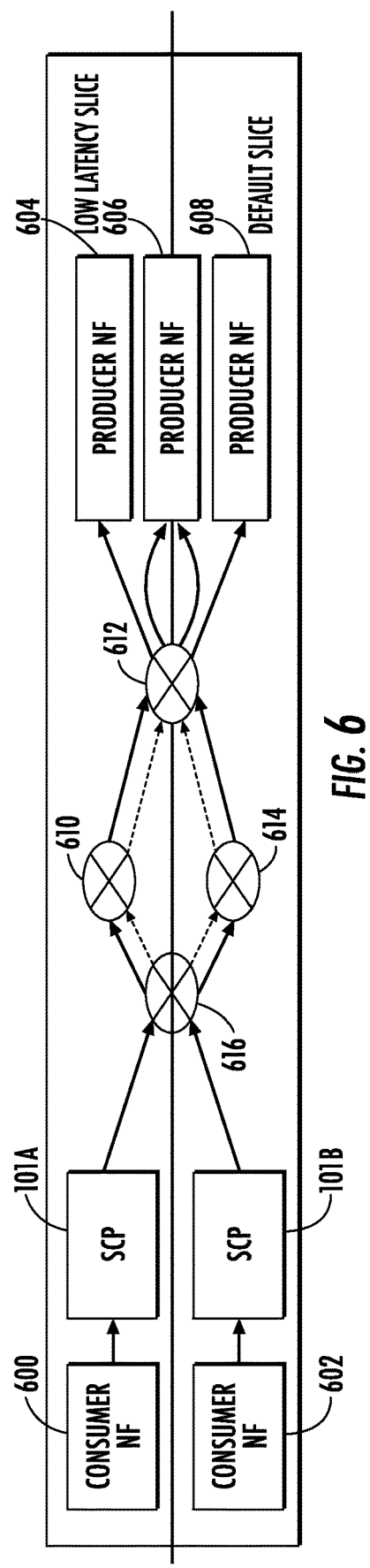
FIG. 6 is a network diagram illustrating communication between consumer NFs and producer NFs via SCP and intermediate routers.

FIG. 6 illustrates the use of DSCP values to perform differential transport quality of service between the SCP and producer NFs. Referring to FIG. 6, consumer NFs 600 and 602 respectively access network services through SCPs 101A and 101B. Consumer NF 600 receives low latency service from producer NF 604 and producer NF 606. Producer NF 604 is exclusively used by a low latency network slice. Producer NF 606 is used by low latency network slice and by a default slice.

Consumer NF 602 accesses a default slice for services. The default slice services are provided by producer NF 608 and by producer NF 606. In FIG. 6, it is assumed that the steps in FIG. 5 have been performed to establish TCP connections with the appropriate DSCP values between SCPs 101A and producer NFs 604 and 606 and between SCP 101B and producer NF 606 and 608. When SCPs 101A and 101B send service traffic to producer NFs 604, 606, and 608, the service traffic is received by intermediate routers 610, 612, 614, and 616. Intermediate routers 610, 612, 614, and 616 extract the DSCP values from the network layer packets (such as IP packets) and apply transport QoS treatment to the network layer packets corresponding to the DSCP values. By applying the QoS to the network layer packets that carry 5G messages, intermediate routers 610, 612, 614, and 616 provide transport QoS for 5G message traffic. Such 5G message traffic can include 5G messages relating to service discovery, 5G content services, 5G subscriptions, etc.

Figure 7:
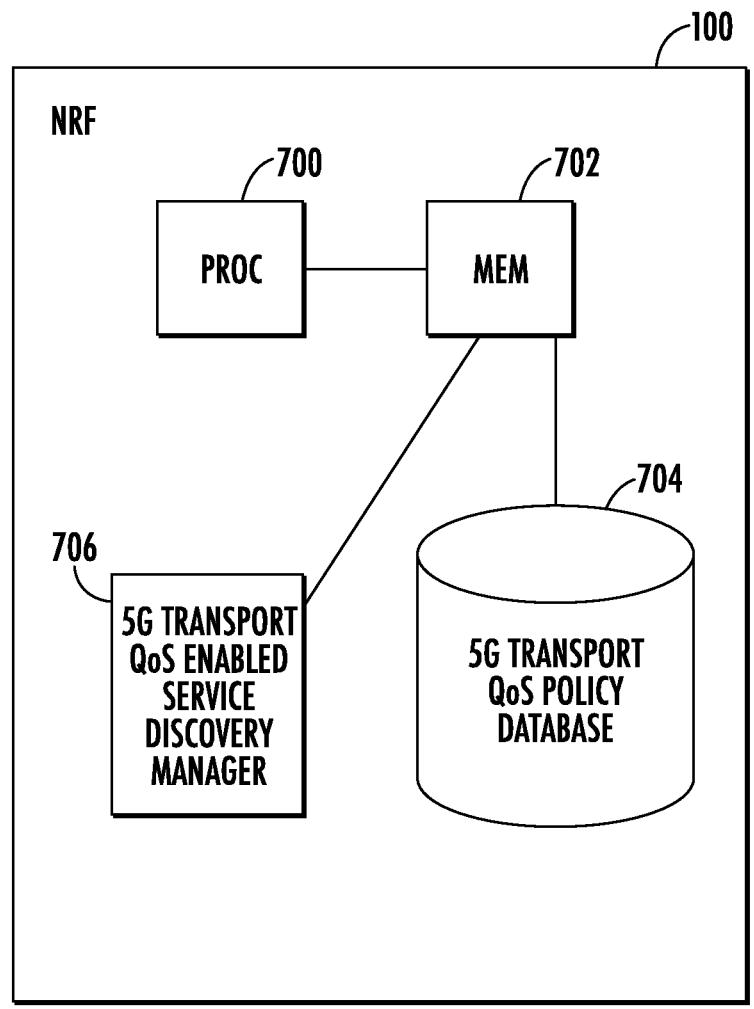
FIG. 7 is a block diagram illustrating an exemplary NRF for providing 5G transport policy information for implementing 5G transport QoS.

FIG. 7 is a block diagram illustrating an exemplary NRF for enabling 5G transport quality of service. Referring to FIG. 7, NRF 100 includes at least one processor 700 and a memory 702. A 5G transport QoS policy database 704 is resident in memory 702. The 5G transport QoS policy database 704 includes policies, such as those illustrated in Table 1 that map service parameters to DSCP values. A 5G transport QoS enabled discovery manager 706 receives service discovery requests from consumer NFs, accesses 5G transport QoS policy database 704 to extract policies for the services identified by the discovery requests and provides DSCP values corresponding to the policies extracted from database 704 to the consumer NFs.

Figure 8:
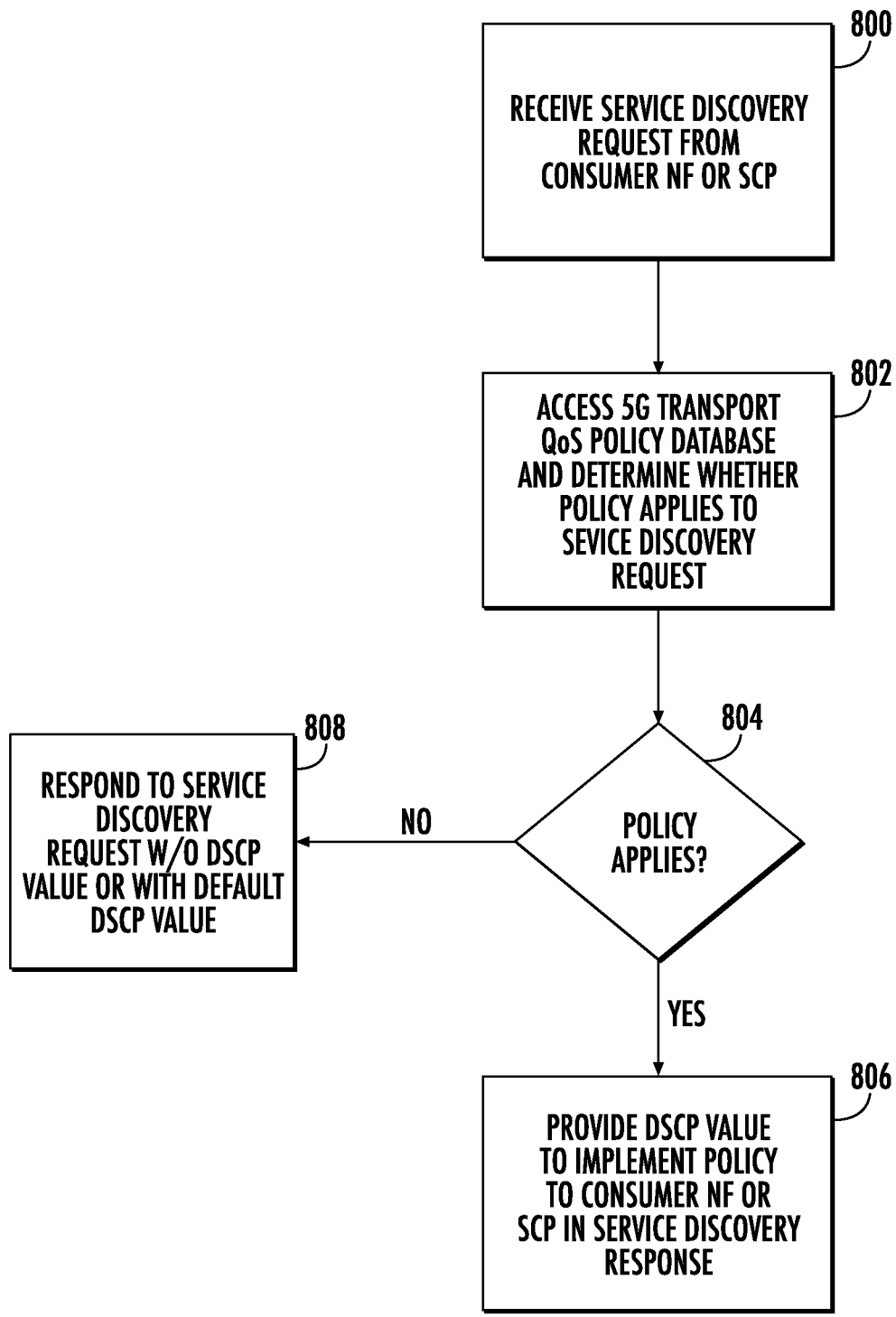
FIG. 8 is a flow chart illustrating an exemplary process for providing 5G transport QoS.

FIG. 8 is a flow chart illustrating exemplary overall steps performed by NRF 100 and processing a service discovery request. The steps are similar to those illustrated in FIG. 3 except they are described at a higher level. Referring to FIG. 8, in step 800, a service discovery request is received from the consumer NF or an SCP. For example, NRF 100 may receive a service discovery request from a consumer NF directly in the direct model or from an SCP in the indirect communications model.

In step 802, the NRF accesses the 5G transport quality of service database to determine whether a policy applies to the service discovery request.

For example, NRF 100 may perform a lookup in 5G transport QoS policy database 704 using parameters from the service discovery request that identified the source of the service, destination of the service, the type of service, etc.

In step 804, the NRF determines whether a policy applies. If a policy applies, control proceeds to step 806 where the NRF provides the DSCP value to implement the policy to the consumer NF in a discovery response message. If a policy does not apply, control proceeds to step 808 where the NRF responds to the service discovery request without the DSCP value or with a default DSCP value. The NF or SCP that receives the service discovery response will insert the DSCP value in network layer messages transmitted between the NF or SCP and a remote NF. Intermediate routers between the NF or SCP and the remote NF will utilize the DSCP value to provide network layer QoS treatment corresponding to the DSCP value for the network layer messages and, by doing so, provide QoS for 5G messages carried by the network layer messages Thus, using the steps in FIG. 8, an NRF can be used to communicate DSCP values to consumer NFs to implement network operator defined 5G transport quality of service without requiring the decision logic to be implemented by every consumer NF.

The disclosure of each of the following references is incorporated herein by reference in its entirety:

REFERENCES

1. "3$^{rd}$ Generation Partnership Project; Technical Specification Group Core Network and Terminals; 5G System; Network Function Repository Services; Stage 3 (Release 16)," 3GPP TS 29.510 V16.1.1 (2019-10).
2. "3$^{rd}$ Generation Partnership Project; Technical Specification Group Core Network and Terminals; 5G Systems; Technical Realization of Service Based Architecture; Stage 3 (Release 16), 3GPP TS 29.500, V16.1.0 (2019-09).
3. "3$^{rd}$ Generation Partnership Project; Technical Specification Group Services and System Aspects; System Architecture for the 5G System (5GS); Stage 2 (Release 16), 3GPP TS 23.501 V16.1.0 (2019-09).
4. Nichols et al., "Definition of the Differentiated Services Field (DS Field) in the IPv4 and IPv6 Headers," Internet Engineering Task Force (IETF) Network Working Group Request for Comments (RFC) 2474, The Internet Society, (December 1998).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for enabling 5G transport quality of service (QoS), the method comprising:
    receiving a service discovery request from a consumer network function (NF) or service communications proxy (SCP);
    accessing a 5G transport QoS policy database and determining that a 5G transport QoS policy applies to the service discovery request; and
    in response to determining that a 5G transport QoS policy applies to the service discovery request, generating a service discovery response message and inserting, in the service discovery response message, a network layer QoS value usable by network nodes to implement the policy; and
    transmitting the service discovery response message to the consumer NF or SCP.

2. The method of claim 1 wherein receiving a service discovery request from a consumer NF or SCP includes receiving the service discovery request from the consumer NF.

3. The method of claim 1 wherein receiving the service discovery request from the consumer NF or SCP includes receiving the service discovery request from the SCP.

4. The method of claim 1 wherein accessing the 5G transport QoS database includes accessing the 5G QoS transport quality database using a service identifier extracted from the service discovery request.

5. The method of claim 4 wherein the service identifier identifies a service endpoint and an application programming interface (API) resource associated with the service endpoint.

6. The method of claim 1 wherein accessing the 5G transport QoS policy database includes accessing the 5G transport QoS policy database using a source public land mobile network (PLMN) identifier.

7. The method of claim 1 wherein the network layer QoS value comprises a differentiated services code point (DSCP) value.

8. The method of claim 1 wherein the network layer QoS value comprises an Internet protocol (IP) type of service (ToS) value.

9. The method of claim 1 comprising using the network layer QoS value to provide transport QoS for 5G messages exchanged between the consumer NF or SCP and a producer NF that provides the service requested in the service discovery request.

10. The method of claim 9 wherein using the network layer QoS value to provide transport QoS for the 5G messages includes applying QoS corresponding to the QoS value to network layer messages that carry the 5G messages.

11. A system for enabling 5G transport quality of service (QoS), the system comprising:
    a network function repository function (NRF) including at least one processor and a memory;
    a 5G transport quality of service QoS database located in the memory; and
    a 5G QoS enabled service discovery manager implemented by the at least one processor for receiving a service discovery request from a consumer network function (NF) or service communications proxy (SCP), accessing a 5G transport QoS policy database and determining that a 5G transport QoS policy applies to the service discovery request; and, in response to determining that a 5G transport QoS policy applies to the service discovery request, generating a service discovery response message and inserting, in the service discovery response message, a network layer QoS value usable by network nodes to implement the policy, and transmitting the service discovery response message to the consumer NF or SCP.

12. The system of claim 11 the 5G QoS enabled service discovery manager is configured to receive the service discovery request from the consumer NF.

13. The system of claim 11 wherein the 5G QoS enabled service discovery manager is configured to receive the service discovery request from the SCP.

14. The system of claim 11 wherein the 5G QoS enabled service discovery manager is configured to access the 5G QoS transport quality database using a service identifier extracted from the service discovery request.

15. The system of claim 14 wherein the service identifier identifies a service endpoint and an application programming interface (API) resource associated with the service endpoint.

16. The system of claim 11 wherein the 5G QoS enabled service discovery manager is configured to access the 5G transport QoS policy database using a source public land mobile network (PLMN) identifier.

17. The system of claim 11 wherein the network layer QoS value comprises a differentiated services code point (DSCP) value.

18. The claim 11 wherein the network layer QoS value comprises an Internet protocol (IP) type of service (ToS) value.

19. The system of claim 11 wherein the NF or SCP is configured to tag network layer packets with the QoS value to indicate to intermediate routers of a QoS requested for 5G messages.

20. A non-transitory computer readable medium having stored thereon executable instructions that when executed by a processor of a computer control the computer to perform steps comprising:
  receiving a service discovery request from a consumer network function (NF) or service communications proxy (SCP);
  accessing a 5G transport QoS policy database and determining that a 5G transport QoS policy applies to the service discovery request; and
  in response to determining that a 5G transport QoS policy applies to the service discovery request, generating a service discovery response message and inserting, in the service discovery response message, a network layer QoS value usable by network nodes to implement the policy; and
  transmitting the service discovery response message to the consumer NF or SCP.

* * * * *

UNITED STATES PATENT AND TRADEMARK OFFICE
CERTIFICATE OF CORRECTION

PATENT NO. : 11,224,009 B2
APPLICATION NO. : 16/730799
DATED : January 11, 2022
INVENTOR(S) : Krishan et al.

It is certified that error appears in the above-identified patent and that said Letters Patent is hereby corrected as shown below:

On the Title Page

Column 1, item (54), in the Title, Line 3, delete "(QOS)" and insert -- (QoS) --, therefor.

On page 3, Column 1, under Other Publications, Line 10, delete "Netwok" and insert -- Network --, therefor.

On page 3, Column 1, under Other Publications, Line 16, after "co-pending" insert -- U.S. --.

On page 3, Column 1, under Other Publications, Line 26, after "co-pending" insert -- U.S. --.

On page 4, Column 2, under Other Publications, Line 7, delete "(Novembers," and insert -- (November 8, --, therefor.

In the Drawings

On sheet 3 of 8, in FIG. 3, under Reference Numeral 302, Line 20, delete "302" and insert -- 312 --, therefor.

In the Specification

In Column 1, Line 3, delete "(QOS)" and insert -- (QoS) --, therefor.

In Column 4, Line 44, delete "computer-readable" and insert -- computer readable --, therefor.

In Column 12, Line 3, delete "aservice" and insert -- a service --, therefor.

In Column 13, Line 25, delete "messages" and insert -- messages. --, therefor.

Signed and Sealed this
Twenty-fifth Day of October, 2022

*Katherine Kelly Vidal*
Katherine Kelly Vidal
*Director of the United States Patent and Trademark Office*

In the Claims

In Column 15, Line 21, in Claim 18, delete "claim" and insert -- system of claim --, therefor.